July 17, 1928.
J. M. WHITE
BATTERY CONNECTER
Filed March 2, 1926
1,677,312
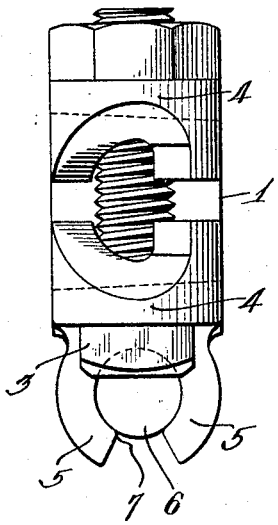
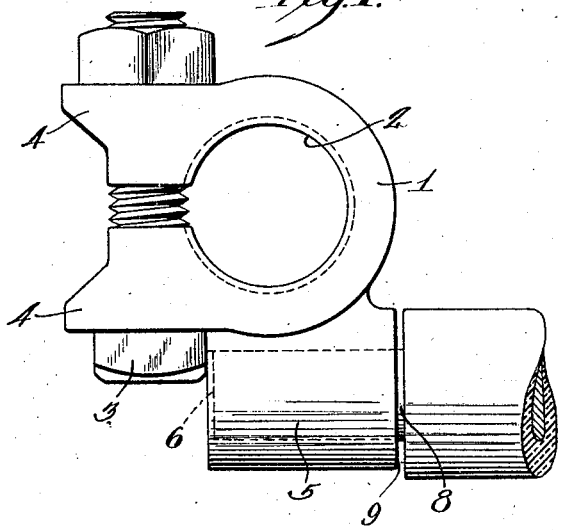
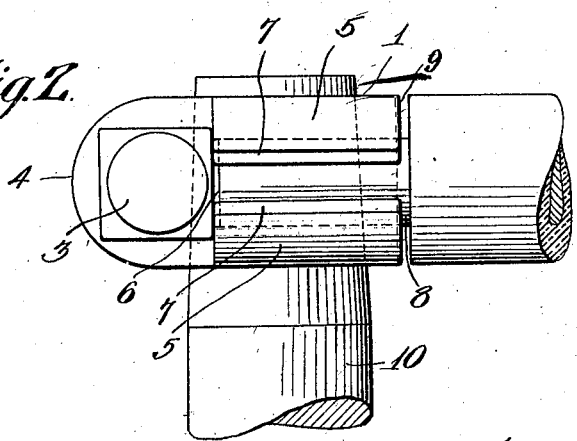
Witnesses:
Walter Chism.
George A. Gruss.
Inventor
Jesse M. White
by
Joshua R. H. Potts
his Attorney.

Patented July 17, 1928.

1,677,312

UNITED STATES PATENT OFFICE.

JESSEE M. WHITE, OF PHILADELPHIA, PENNSYLVANIA.

BATTERY CONNECTER.

Application filed March 2, 1926. Serial No. 91,682.

This invention relates to battery connecters.

In manufacturing cable leads for storage batteries, especially those used on automobiles, it is essential that the cable should extend from the proper side of the connecter. The connecters now used are of such construction that a workman may mistakenly secure the cable so that it extends from the wrong side of the connecter. Such defective cable leads are not only costly when discovered at the factory but are often overlooked and sold, from which much expense and inconvenience results.

The objects of my invention are to provide a battery connecter which is proof against improperly connecting the cable and which will facilitate connecting it to and disconnecting it from the battery.

These objects, and other advantageous ends which will be described hereinafter, I attain in the following manner, reference being had to the accompanying drawings in which:

Figure 1 is a plan view of a battery connecter made in accordance with my invention showing a cable connected thereto, Figure 2 a front edge view of the connecter shown in Figure 1, and Figure 3 a left hand edge view of the connecter shown in Figure 1.

Referring to the drawings, 1 indicates a C-clamp having a tapered inner wall 2 adapted to fit a battery terminal, 3 a bolt passing through the ends 4 of the clamp for tightening the same, 5 a cable securing sleeve integral with the side of the clamp and having one end 6 disposed adjacent the head of bolt 3, so that one of the flat sides of the bolt head will engage the sleeve and prevent turning of the bolt when turning its nut. This sleeve has a longitudinal slit 7 so that the end of the cable 8 when passed into the sleeve through its end 9, may be secured therein by bending the upper and lower parts of the sleeve toward each other to close or partly close the slit.

In assembling the cable lead, the bolt is passed through the ends 4 of the clamp so that a flat side of the bolt head engages the end 6 of the sleeve. The bolt head partly closes end 6 and prevents the workman from passing cable 8 into the sleeve through this end, thus insuring proper connection of the cable to the sleeve by passing it through the other end 9. After the cable is secured in the sleeve, the connecter may be attached to a battery terminal 10, in the usual manner by slipping it on the terminal and tightening the nut of bolt 3. During the tightening of the nut, bolt 3 is held against turning by the flat side of its head being in engagement with the end 6 of the sleeve, thus facilitating connecting the connecter to and disconnecting it from the battery.

Sleeve 5 thus serves to cause the workman to properly connect the cable to the sleeve and to facilitate connection and disconnection of the cable lead with the battery.

While I have described my invention as taking a particular form, it will be understood that the various parts may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. A battery connecter including a clamp; a bolt passing through the ends of the clamp; a sleeve, having a longitudinal slit, formed integral with the clamp; one end of the sleeve engaging the head of the bolt, and the sleeve so positioned that the bolt head partly obstructs one end of the passage through the sleeve.

2. A battery connecter including a clamp; a bolt passing through the ends of the clamp; a sleeve integral with the clamp and having one end engaging the bolt head, the sleeve having a longitudinal slit therein, and a cable adapted to pass only through the other end of the sleeve and secured therein.

3. A battery connecter comprising a C-clamp, a bolt passing through the ends of the clamp, a sleeve integral with the clamp having its axis substantially perpendicular to that of the bolt, said sleeve being so disposed that one end engages the bolt head.

In testimony whereof I have signed my name to this specification.

JESSEE M. WHITE.